United States Patent Office
3,110,292
Patented Nov. 12, 1963

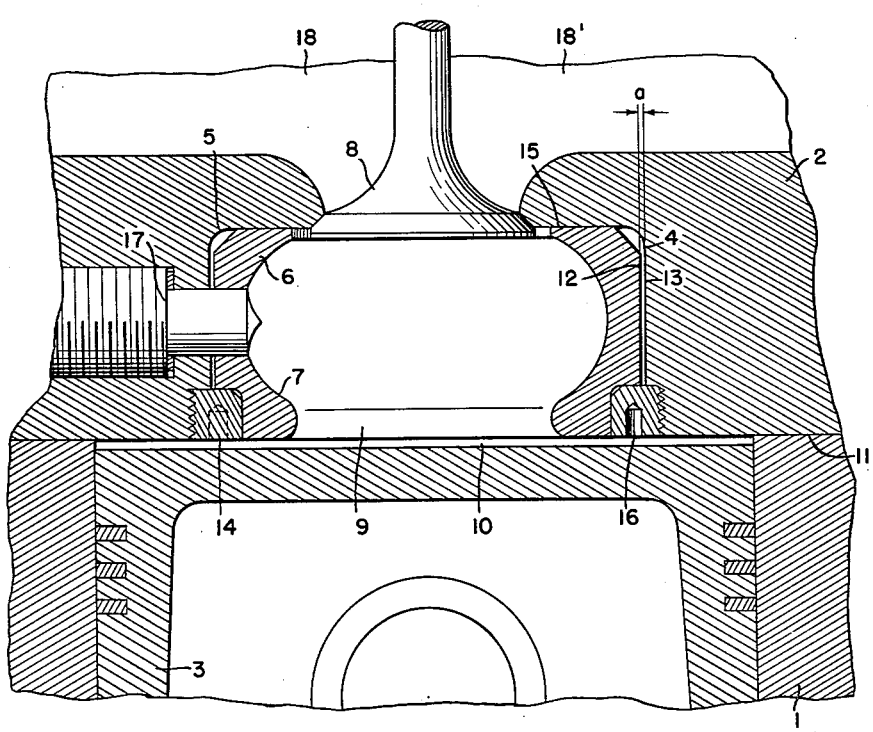

3,110,292
INTERNAL COMBUSTION ENGINE
Slobodan M. Dobrosavljevic, Perside Milenkovic,
Belgrad, Yugoslavia
Filed Sept. 6, 1960, Ser. No. 57,517
5 Claims. (Cl. 123—32)

The present invention relates to an internal combustion engine particularly of the diesel type which is provided with an insert member containing or forming at least in part the combustion chamber, which insert member is arranged within a recess provided within the cylinder head or within the working piston, and has as its principal object the establishing of an automatic regulation or adjustment of the temperature of the combustion chamber walls within the range of the minimum and maximum engine loads.

It is known in connection with diesel engines to provide between the insert member containing the combustion chamber, on the one hand, and the cylinder head, on the other, an air gap by means of which a flow of heat in the direction toward the walls surrounding the insert member is to be prevented. As a result thereof, the combustion chamber walls against which the fuel is injected are kept at a temperature level which lies considerably above the cracking temperature of the fuel. An automatic adaptation or matching of the combustion chamber temperature to the speed of evaporation of the injected fuel in dependence on the engine load is thereby impossible by reason of the constant heat insulation of the combustion chamber in these prior art constructions.

According to the present invention, these disadvantages of the prior art are avoided by inserting or installing the insert member into the engine part surrounding the same with a slight radial play, and by selecting the material for the insert member to have a lower co-efficient of expansion with respect to the material of the engine part in such a manner that a heat or thermal contact of the insert member walls with the walls of the engine part is realized in dependence on the engine loads.

This simple and effective measure achieves an automatic variation of the wall temperature of the combustion chamber in proportion to the required evaporation velocity of the injected fuel. Such an arrangement further enables a relative increase of the combustion chamber temperature with relatively lower engine loads by reason of the initially slight thermal contact between the insert member and the surrounding engine walls whereas with relatively higher engine loads a relative reduction of the combustion chamber temperature takes place as a result of the gradual improvement of the thermal contact of the combustion chamber walls with the engine walls surrounding the same. This insert member thereby consists preferably of an essentially cylindrical base body which is clamped in the axial direction thereof against the base surface of the recess by a threaded ring. As a result thereof, a completely satisfactorily seating of the combustion chamber insert member is achieved with relatively simple structural parts involving low expenditures.

Accordingly, it is an object of the present invention to provide an internal combustion engine, particularly of the diesel type, which effectively eliminates the shortcomings of the prior art by simple means.

Another object of the present invention resides in the provision of a combustion chamber arrangement for diesel-type internal combustion engines in which the temperature is automatically adjusted essentially in dependence on the required speed of evaporation of the injected fuel.

Still another object of the present invention resides in the provision of an insert member defining at least in part the combustion chamber of internal combustion engine which effectively increases the combustion chamber temperature at minimum engine loads while effectively reducing the temperatures of the combustion chamber during maximum engine loads.

A still further object of the present invention resides in the provision of an internal combustion engine in which the temperature of the combustion chamber is effectively limited in such a way as to prevent excessive temperatures therein which might lead to cracking of the fuel.

A further object of the present invention resides in the provision of an insert member which fulfills all of the aims set forth hereinabove by simple means, and which may be readily installed and securely fastened within the engine by inexpensive means.

Still another object of the present invention resides in the provision of an internal combustion engine of the type mentioned hereinabove in which the combustion chamber temperature is automatically adapted to prevailing engine loads in a most appropriate manner.

These and other objects, features and advantages of the present invention will become more obvious from the following description, when taken in connection with accompanying drawing which shows, for purposes of illustration only, in the single FIGURE thereof one embodiment of the present invention.

Referring now to the drawing which shows in the single figure thereof a longitudinal cross-sectional view through a combustion chamber insert member and the surrounding parts of the cylinder head and working cylinder, reference numeral 1 designates therein the cylinder block of a diesel engine. A cylinder head 2 is suitably secured on the cylinder block 1 whereby the cylinder head 2 is provided co-axial to the working piston 3 with a cylindrical recess 4 having a base surface 5. A cylindrical insert member 6 is inserted into the recess 4, which, for example, may be provided with an essentially eliptically-shaped combustion chamber 7. The insert member 6 consists of a material having a smaller co-efficient of expansion, for example, of a steel alloy with a linear co-efficient of expansion of $15.10^{-6}$, than the material of the cylinder head which may be manufactured, for example, of an aluminum alloy with a linear co-efficient of expansion of $22.10^{-6}$. As a result thereof, there exists a ratio of linear thermal expansion of approximately 1.5. The combustion chamber 7 is closed off toward the top thereof by a valve 8 and is provided with an overflow aperture or channel 9 which terminates within the main combustion space 10. The main combustion space 10 is limited by the upper dead center position of the working piston 3 and by the bottom 11 of the cylinder head 2.

The combustion chamber insert 6 is so arranged within the recess 4 that a radial distance indicated by the dimension $a$ remains between the circumferential surface 12 thereof and the walls 13 of the recess 4. Dependent on the structural requirements and selection of the material, the magnitude of the play $a$ amounts to from a few hundredths to about 0.1 millimeter. A threaded ring 14 threadably inserted into the bottom side 11 of the cylinder head 2 serves for retaining the combustion chamber insert 6 within the recess 4. The threaded ring 14 thereby presses the top side 15 of the insert member 6 against the base surface 5 of the recess 4. A pin-type wrench may thereby serve in a known manner for securing the threaded ring 14 whereby the pins of the wrench are inserted into the bores 16 of the threaded ring 14. An injection nozzle 17 is arranged within the circumferential surface 12 of the combustion chamber insert 6 which injection nozzle 17 is retained laterally within the cylinder head 2 in a manner known per se.

During operation of the engine, the combustion air is introduced into the combustion chamber 7 via the inlet air channel 18 through the common inlet and outlet valve 8, and flows from there into the main cylinder space 10 from which it is again returned into the combustion chamber 7 after being compressed in the main cylinder space 10 by the working piston 3. Fuel is injected thereupon into the compressed air by the injection nozzle 17, is brought to combustion and, after the working stroke of the piston 3, is again expelled into the channel area 18'. A slight thermal contact with the walls of the cylinder head 2 thereby exists only at the top side 15 of the combustion chamber insert 6 at first so that the combustion chamber is heated rapidly. With increasing loads of the engine, the insert member 6 begins to expand more strongly by reason of the large heat production whereby the circumferential surface 12 thereof comes into continuously closer thermal contact with the walls 13 of the recess 4 whereby the excess portion of the heat is absorbed by the cylinder head and led away therefrom by the cooling medium.

If it is assumed that with relatively lower loads of the engine, a temperature of approximately 120° C. exists within the area of the cylinder head 2, whereas with higher engine loads a temperature of approximately 220° C. prevails thereat, and if it is assumed that with the given values of the co-efficients of expansion of the cylinder head 2 and combustion chamber, the insert member 6 with an approximately 70 millimeter diameter is inserted into the cylinder head 2 with a radial play $a$ of approximately 0.07 millimeter, then a thermal contact of the combustion chamber wall 12 with the walls 13 of the cylinder head 2 is established, in the first case, at approximately 250° C. whereas the maximum allowable engine load is approximately 400° C. The indicated minimum wall temperature of 250° C. suffices with the given embodiment for the adequate evaporation of the injected fuel whereas the temperature of 400° C. represents approximately the boundry value for the prevention of coking and formation of soot.

Thus, while combustion chambers are known in internal combustion engines which are installed into the cylinder head with a play, such play serves in the prior art exclusively the purpose to effect a heat insulation of the combustion chamber with respect to the cylinder head. Even though a play also exists between the combustion chamber insert and the cylinder head in the present invention, this play must always have a pre-determined value in order to enable the changing thermal contact between co-operating wall parts. This is achieved in accordance with the present invention by providing a definite relationship in the dimension of the play in relation to the relative co-efficients of expansion of the differing materials selected for the insert member and the cylinder head walls surrounding the same, taking into consideration also the expected temperatures of the various parts at minimum and maximum engine loads.

Consequently, the arrangement in accordance with the present invention not only recognizes an existing problem but also provides therefor a simple solution with means not differing substantially from conventional constructions used to date in order to match the combustion chamber temperature to the required evaporation velocity of the injected fuel.

Moreover, the arrangement in accordance with the present invention in effect provides a measure by means of which the temperature of the combustion chamber wall is matched in a continuous and progressive manner from approximately 250° C. to 400° C. to the required velocity of evaporation of the injected fuel without necessitating therefor additional means.

While I have shown and described one embodiment in accordance with the present invention, it is understood that the same is not limited thereto but is susceptible of many changes and modifications within the spirit and scope of the present invention. For example, the basic concept of the present invention is also suitable for combustion chambers arranged within the working piston, and may also be applied to internal combustion engines either of the air-cooled type or liquid-cooled type.

Thus, it is quite clear that the present invention may be modified in numerous ways without departing from the spirit and scope thereof, and I, therefore, do not wish to be limited to the details shown and described herein but intend to cover all such changes and modifications as are encompassed by the scope of the appended claims.

I claim:

1. In an internal combustion engine having a combustion chamber, an engine part provided with a recess, insert means of substantially annular shape for said recess forming at least in part the combustion chamber of the internal combustion engine, said inert means being inserted into said recess with a slight radial play with respect to said engine part, said insert means having a substantially flat upper wall surface in sliding engagement with a portion of said engine part, said insert means having a lower co-efficient of expansion than the material of said engine part, the amount of radial play and the coefficients of expansion of said insert means and of said engine part as well as the heat transfer characteristics therebetween being so correlated that thermic contact of said insert means with the circumferential wall of said engine part is already established substantially under no-load operating conditions to provide a temperature of said insert means under no-load operating conditions substantially corresponding to the lower temperature limit at which vaporization of the fuel occurs, to maintain thermic contact between said insert means and the circumferential wall of said engine part between no-load and full-load operating conditions to thereby assure a continuously and progressively increasing temperature of said insert means as the engine load increases so as to thereby increase correspondingly the speed of fuel evaporation up to the maximum permissive temperature of the insert means which is below the temperature at which the fuel begins to crack and produces soot, and to limit the maximum temperature of the insert means at full-load to said maximum permissive temperature by the resulting heat transfer characteristics between said insert means and the circumferential wall of said engine part.

2. In an internal combustion engine, the combination according to claim 1, wherein said engine part forms part of the cylinder head.

3. In an internal combustion engine, the combination according to claim 1, wherein said engine part forms part of the working piston.

4. In an internal combustion engine having a combustion chamber, an engine part provided with a recess, insert means of a shape having a radial dimension for said recess forming at least in part the combustion chamber of the internal combustion engine, said insert means being inserted into said recess with a predetermined slight radial play with respect to said engine part, said insert means having a different coefficient of expansion than the material of said engine part, the amount of radial play and the coefficients of expansion of said insert means and of said engine part as well as the heat transfer characteristics therebetween being so correlated to each other and to the vaporization temperature of the fuel that thermic contact of said insert means with the circumferential wall of said engine part is already established substantially under no-load operating conditions to provide a temperature of said insert means under no-load operating conditions substantially corresponding to the lower temperature limit at which vaporization of the fuel takes place, to maintain thermic contact between said insert means and the circumferential wall of said engine part throughout the range between no-load and full-load operating conditions to thereby assure a continuously and progressively increasing temperature of said insert means as the engine load increases so as to thereby increase correspondingly the speed of fuel evaporation within said insert means up to the maximum permissive temperature of the insert means which is determined by and lies below that temperature at which the fuel commences to crack and produces soot, and to limit the maximum temperature of the insert means at full-load to said maximum permissive temperature by the heat transfer characteristics between said insert means and the circumferential walls of said engine part.

5. In an internal combustion engine according to claim 4, wherein the radial play, the coefficients of expansion and the heat transfer characteristics therebetween are so correlated that the no-load temperature of said insert means is approximately 250° C. and the maximum permissive temperature of the insert means is approximately 400° C.

References Cited in the file of this patent

UNITED STATES PATENTS

| | | |
|---|---|---|
| 1,500,464 | Morrison | July 8, 1924 |
| 1,595,148 | Gardner | Aug. 10, 1926 |
| 2,865,346 | Liebel | Dec. 23, 1958 |
| 2,868,181 | Dolza | Dec. 13, 1959 |
| 2,949,899 | Jacklin | Aug. 23, 1960 |